United States Patent
Nagami (10) Patent No.: US 10,551,686 B2
(45) Date of Patent: Feb. 4, 2020

(54) LIQUID CRYSTAL DISPLAY DEVICE AND MOTHER SUBSTRATE

(71) Applicant: Japan Display Inc., Tokyo (JP)

(72) Inventor: Takahiro Nagami, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/224,923

(22) Filed: Dec. 19, 2018

(65) Prior Publication Data

US 2019/0146258 A1 May 16, 2019

Related U.S. Application Data

(63) Continuation of application No. 15/928,224, filed on Mar. 22, 2018, now Pat. No. 10,191,335, which is a
(Continued)

(30) Foreign Application Priority Data

Jun. 14, 2011 (JP) .................................. 2011-131714

(51) Int. Cl.
  *G02F 1/1339* (2006.01)
  *G02F 1/1333* (2006.01)
  *G02F 1/1335* (2006.01)

(52) U.S. Cl.
  CPC .... *G02F 1/13394* (2013.01); *G02F 1/133345* (2013.01); *G02F 1/133351* (2013.01);
(Continued)

(58) Field of Classification Search
  None
  See application file for complete search history.

(56) References Cited

U.S. PATENT DOCUMENTS 7,142,273 B1  11/2006  Zhang et al.
8,027,010 B2  9/2011  Kim et al.
  (Continued)

FOREIGN PATENT DOCUMENTS

CN  2001-174827 A  6/2001
CN    101211041 A  7/2008
  (Continued)

OTHER PUBLICATIONS

Japanese Office Action dated Mar. 17, 2015 regarding counterpart Japanese Patent Application No. 2011-131714.
(Continued)

*Primary Examiner* — Richard H Kim
(74) *Attorney, Agent, or Firm* — Michael Best & Friedrich LLP (57) ABSTRACT

In a liquid crystal display device including a TFT substrate and a counter substrate, when an organic passivation film is not formed in the TFT substrate, the distance between the TFT substrate and the counter substrate in the display area of a liquid crystal display panel is provided by a cylindrical spacer. Also, the distance in the area where pixels, scan lines, and image signal lines are not formed within the liquid crystal display panel is provided by the cylindrical spacer. In this case, it is necessary to form a mount. The layer structure of the mount is the same as that of the TFT substrate with which the cylindrical spacer in the display area comes into contact. This makes it possible to equalize the distance of the liquid crystal layer of the liquid crystal display panel without an increase in production cost, and to prevent uneven brightness or color.

6 Claims, 10 Drawing Sheets

Related U.S. Application Data continuation of application No. 15/649,780, filed on Jul. 14, 2017, now Pat. No. 9,958,734, which is a continuation of application No. 15/063,684, filed on Mar. 8, 2016, now Pat. No. 9,740,054, which is a continuation of application No. 13/489,479, filed on Jun. 6, 2012, now Pat. No. 9,316,855.

(52) U.S. Cl.
CPC .. G02F 1/133512 (2013.01); G02F 1/133514 (2013.01); *G02F 2001/133357* (2013.01)

(56) References Cited

U.S. PATENT DOCUMENTS

| | | |
|---|---|---|
| 9,958,734 B2 | 5/2018 | Nagami |
| 2003/0076572 A1 | 4/2003 | Kawase |
| 2005/0190335 A1 | 9/2005 | Maruyama et al. |
| 2008/0158496 A1 | 7/2008 | Kim et al. |
| 2009/0180069 A1 | 7/2009 | Nishimura |
| 2010/0091235 A1 | 4/2010 | Chiang |
| 2011/0228207 A1* | 9/2011 | Lee .................. G02F 1/133351 349/155 |
| 2011/0285929 A1* | 11/2011 | Kubota ............... G02F 1/13394 349/43 |

FOREIGN PATENT DOCUMENTS

| | | |
|---|---|---|
| JP | 2002-328373 A | 11/2002 |
| JP | 2003-107491 A | 4/2003 |
| JP | 2004-004988 A | 1/2004 |
| JP | 2004-4988 A | 1/2004 |
| JP | 2009-168878 A | 7/2009 |
| JP | 2010-145841 A | 7/2010 |
| JP | 2010-204405 A | 9/2010 |

OTHER PUBLICATIONS

Japanese Office Action dated Aug. 26, 2014 regarding corresponding Japanese Patent Application No. 2011-131714.
Communication issued in connection with corresponding Chinese Application No. 201210199551.6 dated Jul. 31, 2014.
Japanese Office Action dated Dec. 19, 2017 for the corresponding Japanese Patent Application No. 2017-064262.

* cited by examiner

FIG. 12

LIQUID CRYSTAL DISPLAY DEVICE AND MOTHER SUBSTRATE

CROSS-REFERENCE TO RELATED APPLICATIONS

This application is a continuation of U.S. patent application Ser. No. 15/928,224, filed on Mar. 22, 2018, which, in turn, is a continuation of U.S. patent application Ser. No. 15/649,780 (now U.S. Pat. No. 9,958,734), filed on Jul. 14, 2017, which, in turn, is a continuation of U.S. patent application Ser. No. 15/063,684 (now U.S. Pat. No. 9,740, 054), filed on Mar. 8, 2016, which, in turn, is a continuation of U.S. patent application Ser. No. 13/489,479 (now U.S. Pat. No. 9,316,855), filed on Jun. 6, 2012. Further, this application claims priority from Japanese Patent Application JP 2011-131714 filed on Jun. 14, 2011, the entire contents of which are hereby incorporated by reference into this application.

FIELD OF THE INVENTION

The present invention relates to a display device, and more particularly to a display device that can equalize the distance between upper and lower substrates to prevent the degradation of the display quality such as uneven brightness and color.

BACKGROUND OF THE INVENTION

A display device, for example, a liquid crystal display panel used for a liquid crystal display device, includes a TFT substrate, a counter substrate facing the TFT substrate, and a liquid crystal sandwiched between the TFT substrate and the counter substrate. In the TFT substrate, pixels having pixel electrodes, thin film transistors (TFT) and the like are arranged in a matrix. In the counter substrate, color filters and the like are formed at locations corresponding to the pixel electrodes of the TFT substrate. In this way, the liquid crystal display device forms an image by controlling the transmittance of light of the liquid crystal molecules for each pixel.

Liquid crystal display devices are flat and lightweight and extensively used is growing in a variety of applications. Compact liquid crystal display devices are widely used in electronic devices such as mobile phones and digital still cameras (DSC). The viewing angle characteristics are important for the liquid crystal display device. The viewing angle characteristic is the phenomenon in which the brightness changes or the color changes between when the display is viewed from the front and when the display is viewed from an oblique direction. The viewing angle characteristics are excellent in the in-plane switching (IPS) mode in which liquid crystal molecules are moved by the electric filed in the horizontal direction.

There are many different types of the IPS mode. For example, a common electrode is formed flat, on which a pixel electrode having a slit is provided with an insulating film interposed therebetween, to rotate liquid crystal molecules by the electric field generated between the pixel electrode and the common electrode. This type can increase the light transmittance and is becoming mainstream. There is a structure in which an organic passivation film is provided between the pixel electrode and common electrode and the TFT substrate. However, in order to simplify the manufacturing process, a structure in which the organic passivation film is not provided is also becoming popular.

In the liquid crystal display device, the distance between the TFT substrate and the counter substrate, namely, the thickness of the liquid crystal layer has a significant influence on the characteristics, in general, the liquid crystal display device has been configured such that the distance in the display area is maintained by a cylindrical spacer, and that the distance in a sealing portion is maintained by a glass fiber. In recent years, however, in order to reduce the width of the so-called frame of the liquid crystal display panel, the leaders of scan lines or image signal lines are formed on the lower side of the sealing portion by double metal layer technology. In this case, the glass fiber is hard, so that there is a risk that the scan line leaders or image signal line leaders will be destroyed in gap adjustment. In order to prevent this, JP-A No. 168878/2009 describes the use of a cylindrical spacer formed by a resin also in the sealing portion.

Further, JP-A No. 168878/2009 also describes a method for providing an organic passivation film as a mount for the cylindrical spacer in the sealing portion or in the vicinity thereof, in order to adjust the distance between the TFT substrate and the counter substrate in the display area.

In the third embodiment of JP-A No. 168878/2009 there is described a liquid crystal display device in which the organic passivation film is not present. Also in this case, the distance between the TFT substrate and the counter substrate in the sealing portion is provided by the cylindrical spacer without using the glass fiber. Further, there is also proposed a structure for forming cylindrical spacers both inside and outside the sealing portion. In JP-A No. 168878/2009, however, there is no description of a method for providing the distance by the cylindrical spacers in the display area and in the vicinity of the sealing portion when the organic passivation film is not used.

SUMMARY OF THE INVENTION

In the display device, for example, in the liquid crystal display device, a driving circuit is directly formed into the liquid crystal display panel in order to reduce the overall size of the liquid crystal display device and reduce the number of leaders of lines. In this case, when the driving circuit is formed by poly silicon, the circuit characteristics are improved. However, when the TFT in the pixel area is formed by a–Si, the process is complicated. On the other hand, the circuit size of the scan line driving circuit is smaller than that of the image signal line driving circuit, so that the scan line driving circuit can be formed by a–Si. For this reason, only the scan line driving circuit is directly formed by a–Si into the liquid crystal display panel and the image signal line driving circuit is formed by an IC driver. In such a structure, if the glass fiber is used for gap adjustment in the sealing portion, there is a risk that the scan line driving circuit will be destroyed. Thus, it is necessary to use the cylindrical spacer formed by a resin.

Further, when the organic passivation film is used as described in the background of the invention, the organic passivation film also serves as a flattening film. When the organic passivation film is not used, the distance between the TFT substrate and the counter substrate varies in different locations of the liquid crystal display panel. In this case, even if the cylindrical spacer is used, it is difficult to maintain the distance between the TFT substrate and the counter substrate to be constant.

It would be desirable to provide a liquid crystal display device in which the distance between the TFT substrate and the counter substrate does not vary, so that uneven brightness, uneven color, or other imperfections are not likely to occur in the liquid crystal display panel without using the inorganic passivation film that serves as a flattening film.

The present invention overcomes the above problems by means of the following steps. A liquid crystal display device has a liquid crystal display panel including a TFT substrate and a counter substrate facing the TFT substrate through a sealing material, with a liquid crystal sandwiched between the TFT substrate and the counter substrate. A display area where pixels are formed is provided inside the sealing material of the TFT substrate. Then, an area where scan lines or image signal lines are formed as well as an area where the scan lines and image signal lines are not formed are provided on the outside of the display area inside the sealing material of the TFT substrate. A flattening film formed of an organic film is not present in the display area. A cylindrical spacer is formed in the display area to provide the distance between the TFT substrate and the counter substrate. Inside the sealing material and outside the display area, a layer structure, which is the same as the layer formed in the TFT substrate with which the cylindrical spacer comes into contact, is formed in the display area. The metal layer of the layer structure formed on the outside of the display area is floating.

Other key aspects of the present invention are as follows. A display device has a first substrate and a second substrate facing the first substrate through a sealing material. A display area where pixels are formed is provided inside the sealing material of the first substrate. Then, an area where a line or driving circuit is formed as well as an area where the line and driving circuit are not formed are provided on the outside of the display area inside the sealing material of the first substrate. A flattening film formed by an organic film is not present in the display area. Inside the sealing material and outside the display area, a cylindrical spacer is formed in the display area to provide the distance between the first and second substrates. A mount is formed for the cylindrical spacer provided in the area where the line and the driving circuit are not present. The mount has the same layer structure as the layer formed corresponding to the cylindrical spacer in the display area.

According to the present invention, it is possible to equalize the distance between the TFT substrate and the counter substrate in the liquid crystal display panel. Thus, it is possible to prevent uneven gap of the liquid crystal display. In other words, it is possible to prevent uneven brightness and color due to the variation of the distance between the TFT substrate and the counter substrate. The mount, which is a feature of the present invention, can be formed when the display area of the liquid crystal display panel is formed. Thus, the number of steps of the manufacturing process is not increased. As a result, it is possible to prevent the uneven brightness and color in the liquid crystal display device without an increase in the production cost.

DETAILED DESCRIPTION OF THE PREFERRED EMBODIMENTS

Hereinafter, the present, invention will be described in detail with reference to embodiments.

First Embodiment

Figure 1:
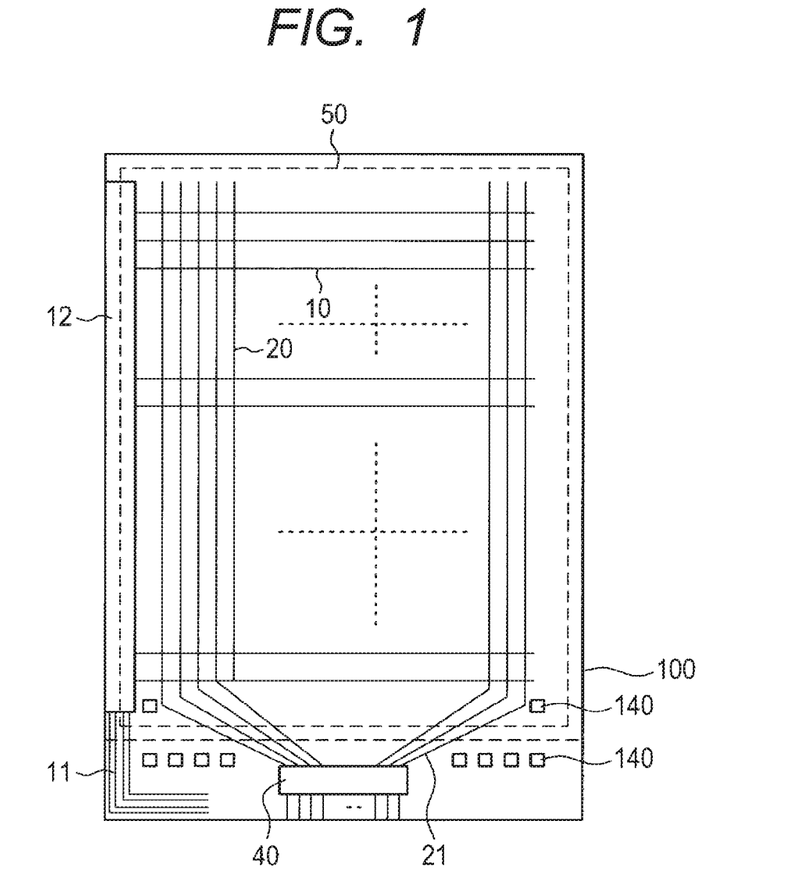
FIG. 1 is a plan view of a TFT substrate of a liquid crystal display panel according to the present invention.

FIG. 1 is a plan view of a TFT substrate 100 according to the present invention. In FIG. 1, scan lines 10 extend in the horizontal direction and are arranged in the vertical direction in the display area. A scan line driving circuit 12 is formed on the left side of the TFT substrate 100. The scan lines 10 extend in the horizontal direction from the scan line driving circuit 12. Scan line driving circuit leaders 11 are formed in the scan line driving circuit to fetch signals from the outside. In FIG. 1, image signal lines 20 extend in the vertical direction and are arranged in the horizontal direction. Then, image signal line leaders 21 extend from the image signal, lines 20 to an IC driver 40.

The peripheral area between the dashed lines and the end portion shown in FIG. 1 is a sealing portion 50. In FIG. 1, a mount 140 for a cylindrical spacer 150 formed in a counter substrate 200, not shown, is not present in a terminal portion where the lines are not present. In FIG. 1, this corresponds to the area where the image signal line 20 and the scan line 10 are not provided inside the sealing portion 30, as well as the area where the image signal line leader 21 and the scan line driving circuit leader 11 are not provided on the outside of the sealing portion 50. In FIG. 1, two mounts 140 are formed inside the sealing portion 50, and two groups of four mounts 140 are formed in two places on the outside of the sealing portion 50. However, this is only an example, and in general more of the mounts 140 are formed inside and outside the sealing portion 50. Although not shown in FIG. 1, the mounts 140 are also formed in the display area at a predetermined pitch. In general, the cylindrical spacer 150 formed inside the display area is smaller than the cylindrical spacer 150 formed outside the display area. Thus, the mount 140 for the cylindrical spacer 150 formed inside the display area is also small. However, the pitch, the size, and the like of the mount 140 vary according to the needs of each product.

Figure 2:
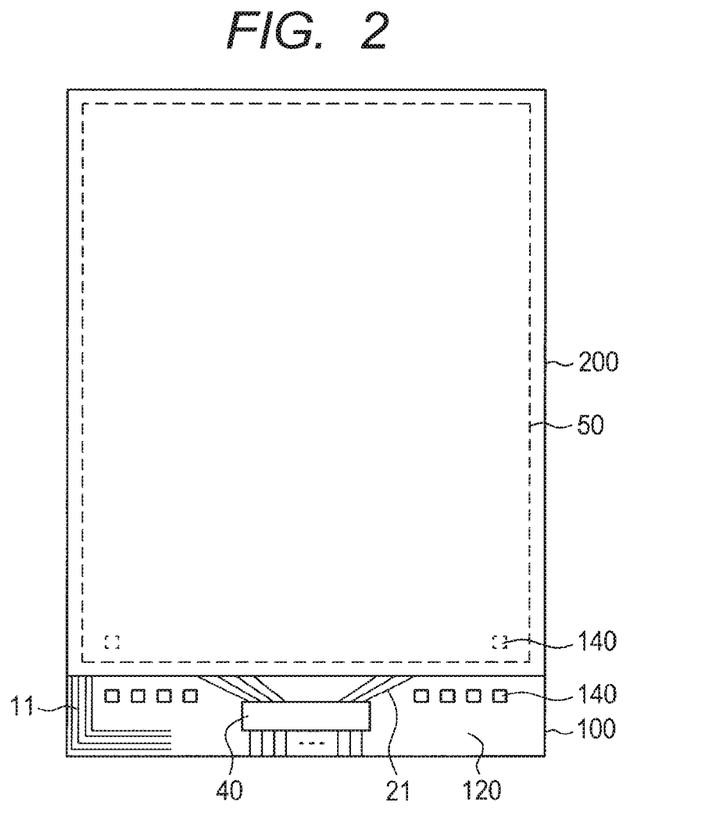
FIG. 2 is a plan view of the liquid crystal display panel according to the present invention.

FIG. 2 shows the state in which the counter substrate 200 is attached through the sealing material 50 with respect to FIG. 1. The inside of the sealing portion 50 is not shown except for the mounts 140. In FIG. 2, the counter substrate 200 is not present in a terminal portion 120. Thus, the structure shown in FIG. 2 is the same as the structure shown in FIG. 1. In FIG. 2, the cylindrical spacer 150, not shown, is present in the mount 140 within the sealing portion 50. However, the cylindrical spacer 150 is not present in each of the mounts 140 in the terminal portion 120. This is because the cylindrical spacer 150 is removed at the same time when the area corresponding to the terminal portion of the counter substrate 200 is removed.

Figure 3:
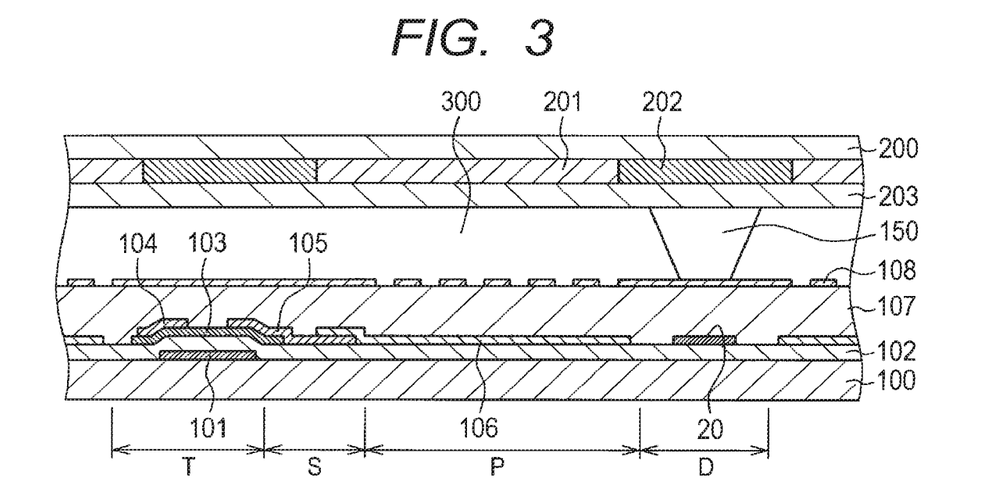
FIG. 3 is a cross-sectional view of the display area of the liquid crystal display panel according to the present invention.

FIG. 3 is a cross-sectional view of the display area of an IPS to which the present invention is applied. In FIG. 3, a gate electrode 101 is formed on the TFT substrate 100 formed from glass. For example, the structure of the gate electrode 101 is such that MoCr is formed on an AlNd alloy. Then, a gate insulating film 102 is formed by sputtering SiN onto the gate electrode 101.

A semiconductor layer 103 is formed on the gate insulating film 102 above the gate electrode 101. An a–Si film is formed by CVD as the semiconductor layer 103. There are a drain electrode 104 and a source electrode 105 formed facing each other on the semiconductor layer 103. The drain electrode 104 and the source electrode 105 are formed by MoCr at the same time. A channel layer is formed between the drain electrode 104 and the source electrode 105 in the TFT. Note that an n+Si layer, not shown, is formed between the semiconductor layer 103 and the drain electrode 104 or the source electrode 105 to obtain an ohmic contact.

In FIG. 3, the drain electrode 104 or the source electrode 105 is formed, and then a pixel electrode 106 is formed flat by ITO. A portion of the pixel electrode 106 overlaps the source electrode 105 to provide an electrical contact between the pixel electrode 106 and the source electrode 105. Then, an inorganic passivation film 107 is formed so as to cover the drain electrode 104, the source electrode 105, the pixel electrode 106 and the like. The passivation film 107 is formed by CVD of SiN. The original purpose of the passivation film 107 is to protect the TFT. In FIG. 3, however, the passivation film 107 also serves as an insulating film between the common electrode 108 and the pixel electrode 106.

A comb-like common electrode 108 is formed on the passivation film 107. An oriented film, not shown, is formed on the common electrode 108. Then, the liquid crystal layer is present on the oriented film. In FIG. 3, T represents the area where the TFT is formed, S represents the area where the source electrode 105 is formed, P represents the area where the pixel electrode 106 is formed, and D represents the area where the image signal line 20 is formed, respectively.

In FIG. 3, a color filter 201 and a black matrix 202 are formed on the counter substrate 200, on which an overcoat film 203 is formed. The cylindrical spacer 150 is formed on the overcoat film 203. The black matrix 202 formed on the counter substrate 200 covers the cylindrical spacer 150, and the image signal line 20 and the like formed on the counter substrate 200. Note that the oriented film on the overcoat film 203 is not shown in the figure.

As shown in FIG. 3, the distance between the TFT substrate 100 and the counter substrate 200 is maintained by the cylindrical spacer 150. In FIG. 3, in the portion with which the cylindrical spacer 150 comes into contact, the gate insulating film 102, the image signal line 20, the inorganic passivation film 107, and the common electrode 108 are present. Thus, these films have the same function as the mount.

Figure 4:
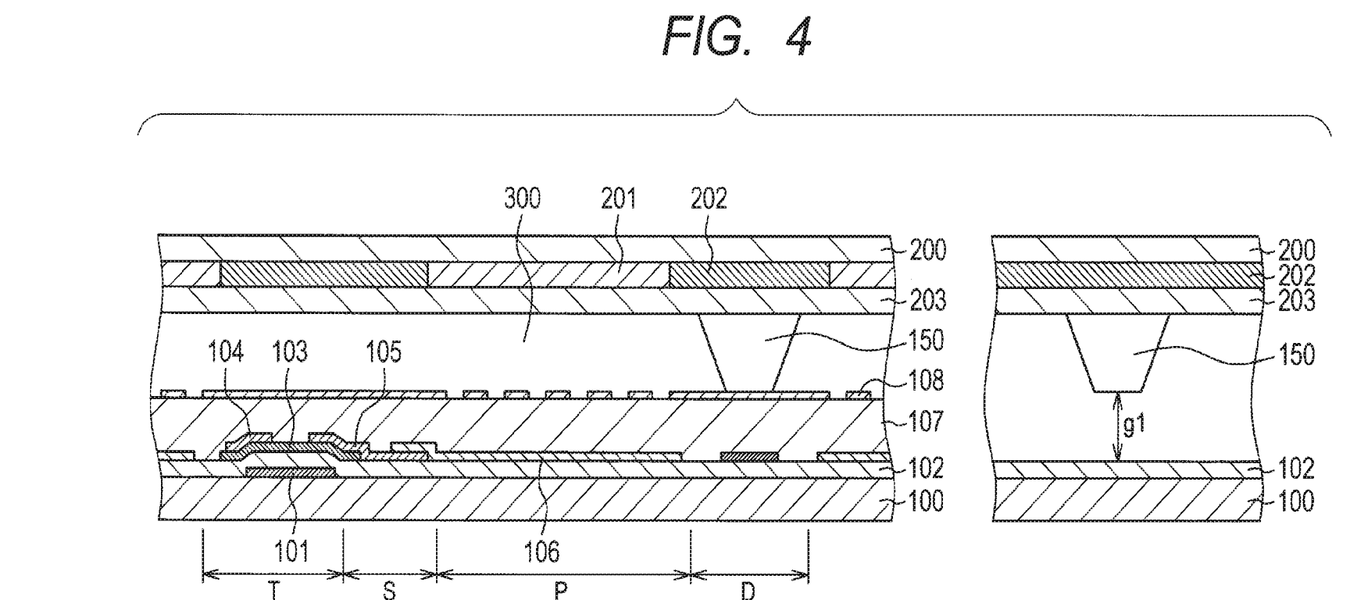
FIG. 4 shows a cross-sectional view of the display area in the liquid crystal display device, and a cross-sectional view of the area where lines are not present inside a sealing material.

FIG. 4 shows cross-sectional views in which the cylindrical spacer 150 is formed in the area where the lines and the like are not provided inside the sealing portion 50. The left side of FIG. 4 is the same as FIG. 3 and the description thereof will be omitted. As shown in FIG. 4, also inside the sealing portion 50, there is only the gate insulating film 102 present in the TFT substrate 100 in the area where the lines and the like are not provided. Thus, the end of the cylindrical spacer 150 is floating with a gap g1 between the TFT substrate 100 and the gate insulating film 102. For this reason, even if the cylindrical spacer 150 is formed, it is difficult to properly form a gap between the TFT substrate 100 and the counter substrate 200.

Figure 5:
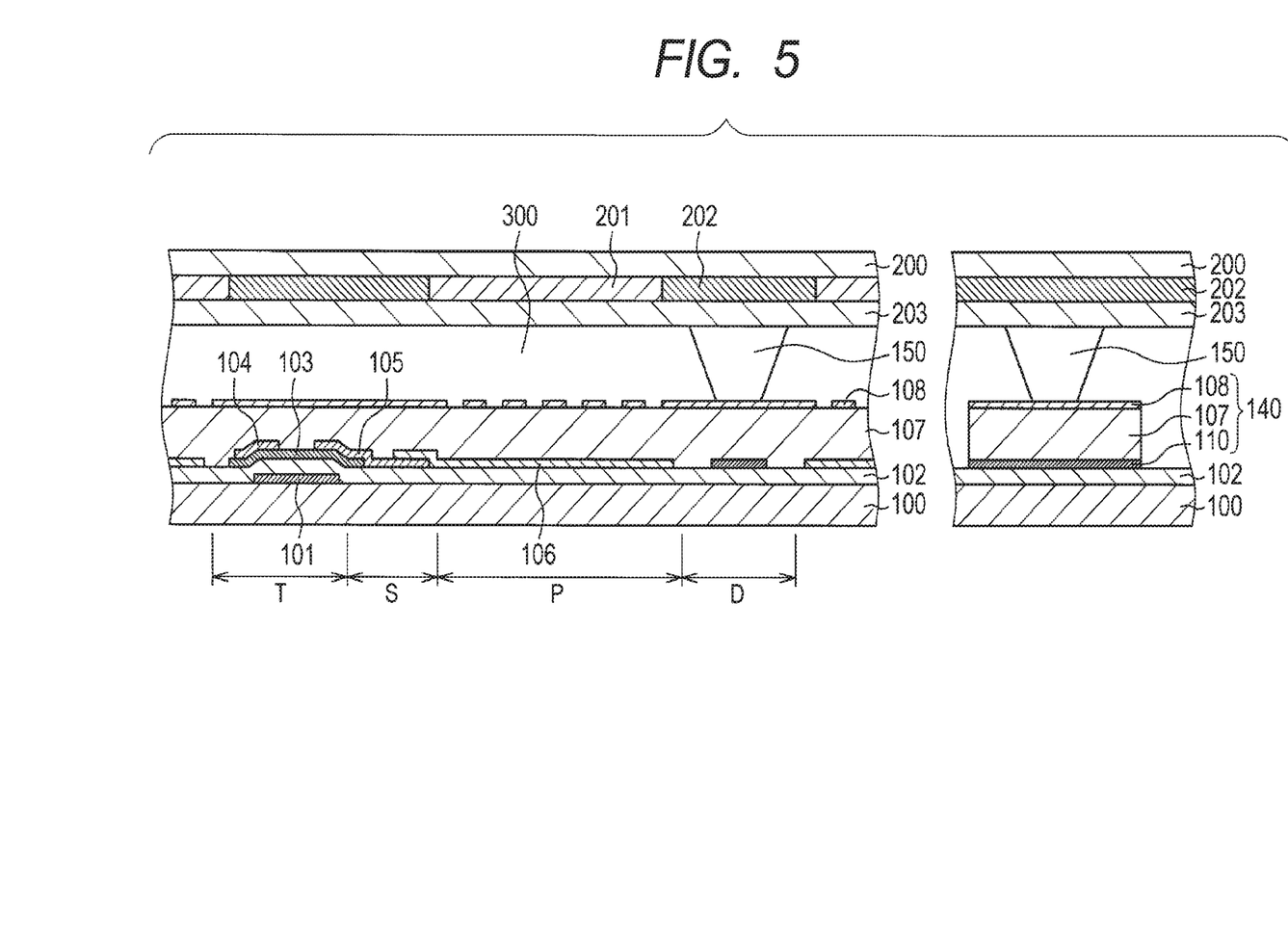
FIG. 5 shows a cross-sectional, view of the display area in the liquid crystal display device according to the present invention, and a cross-sectional view of the area where lines are not present inside the sealing materials.

FIG. 5 shows cross-sectional views of the portion of the cylindrical spacer 150 inside the sealing portion 50. In FIG. 5, the mount 140 is formed in the portion of the TFT substrate 100 facing the cylindrical spacer 150 in the area where the lines are not provided. The mount 140 has the same film structure as the portion where the cylindrical spacer 150 is formed in the display area. In FIG. 5, the mount 140 is formed on the gate insulating film 102. The mount 140 is formed by a metal layer 110 which is the same layer as the image signal line, the inorganic passivation film 107, and the ITO 108 which is the same layer as the common electrode. The metal layer 110 and the ITO 108 of the layers forming the mount 140 are conductive films. These conductive layers are floating.

Figure 6:
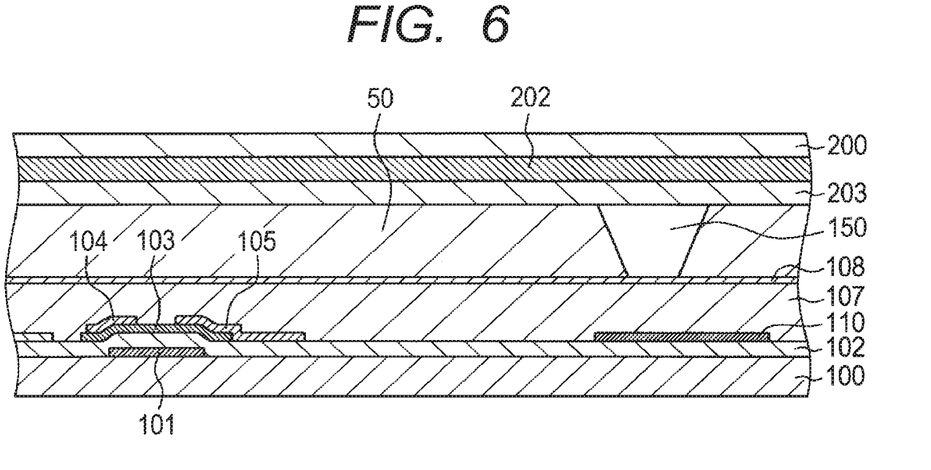
FIG. 6 is a cross-sectional view of the sealing portion of the liquid crystal display device according to the present invention.

FIG. 6 is a cross-sectional view shewing the state in which the distance between the TFT substrate 100 and the counter substrate 200 in the sealing portion 50 is provided by the cylindrical spacer 150, when the TFT for the scan line driving circuit 12 is formed in the sealing portion 50. In FIG. 6, the cylindrical spacer 150 is formed over the TFT substrate 100 in the area of the same film structure as that shown in FIG. 3. In FIG. 6, when the black matrix 202 and the overcoat film 203 are formed on the counter substrate 200 in which the cylindrical spacer 150 is formed, there is a possibility that the adhesion of the sealing material 50 is reduced. In this case, the black matrix 202 and the overcoat film 203 may be formed like islands only in the area where the cylindrical spacer 150 is formed. In FIG. 6, the structure with only one TFT is disclosed. However, a plurality of TFTs are formed in the scan line driving circuit and various lines are provided to connect the TFTs, but there is no particular limitations with respect to these structures.

As described above, according to this embodiment, it is possible to properly provide the distance between the TFT substrate 100 and the counter substrate 200 both in the display area and the surrounding area, at least inside the sealing portion 50. Thus, it is possible to prevent the uneven brightness, uneven color, or other imperfections due to the uneven gap and the like.

Second Embodiment

In order to increase the productivity of liquid crystal display panels, a large number of liquid crystal display panels (liquid crystal cells) are formed in a mother substrate 1000 to simultaneously form a large number of liquid crystal cells. Thus, if the distance between the TFT substrate 100 and the counter substrate 200 in each liquid crystal cell is not properly provided in the state of the mother substrate 1000, this will appear as uneven gap of the product.

Figure 7:
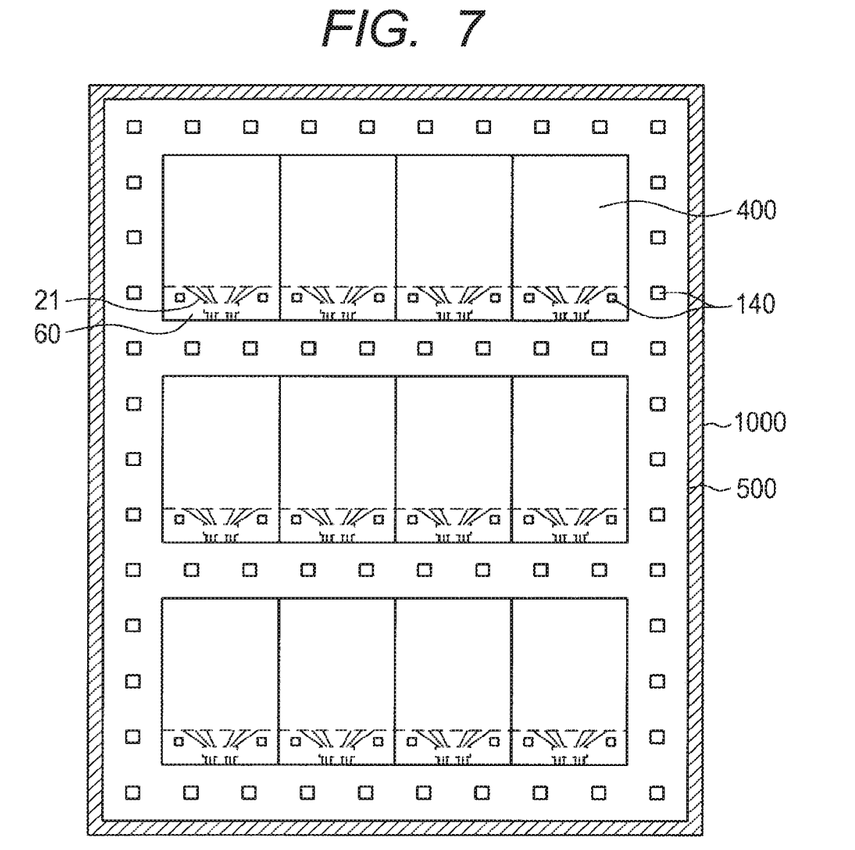
FIG. 7 is a plan view of a mother substrate according to the present invention.

FIG. 7 is a schematic plan view of the structure to solve this problem. FIG. 7 shows the mother substrate 1000 in which a large number of liquid crystal cells are formed. The mother substrate 1000 is formed by bonding a mother TFT substrate in which a large number of TFT substrates 100 are formed, and a mother counter substrate in which a large number of counter substrates 200 are formed, by a mother substrate sealing material 500 as well as the sealing material 50 formed in each liquid crystal display panel.

In FIG. 7, twelve liquid crystal cells are formed in one mother substrate 1000. The dashed line of each liquid crystal cell indicates the boundary between the display area and a terminal portion 60. In the state shown in FIG. 7, the counter substrate 200 still faces the portion opposite to the terminal portion 60. Thus, in order to maintain the distance between the TFT substrate 100 and the counter substrate 200 to be a predetermined distance, it is necessary to provide the cylindrical spacer 150 formed in the counter substrate 200 and the mount 140 formed in the TFT substrate 100 also in the terminal portion 60. Note that the image signal line leaders 21 are provided in the terminal portion 60 of each liquid crystal cell shown in FIG. 7. Further, the positions of the IC drivers are indicated by the dashed lines. However, the IC drivers are not yet mounted in the state of the mother substrate.

In FIG. 7, also in the area where the individual liquid crystal cells are not formed, the mount 140 for the cylindrical spacer 150 is formed in the TFT substrate 100, and the cylindrical spacer 150 (not shown) is formed in the counter substrate 200. In this way, it is possible to equalize the distance between the TFT substrate 100 and the counter substrate 200 in the entire mother substrate 1000. As a result, the distance can be fixed in each liquid crystal cell. In FIG. 7, the mother substrate sealing material 500 is formed around the entire perimeter of the mother substrate 1000 to make the inside of the mother substrate 1000 airtight. The reason why the inside of the mother substrate 1000 is made airtight is that the outside of the substrate may be ground to reduce the thickness of the TFT substrate 100 or the counter substrate 200 after the mother substrate is formed.

Figure 8:
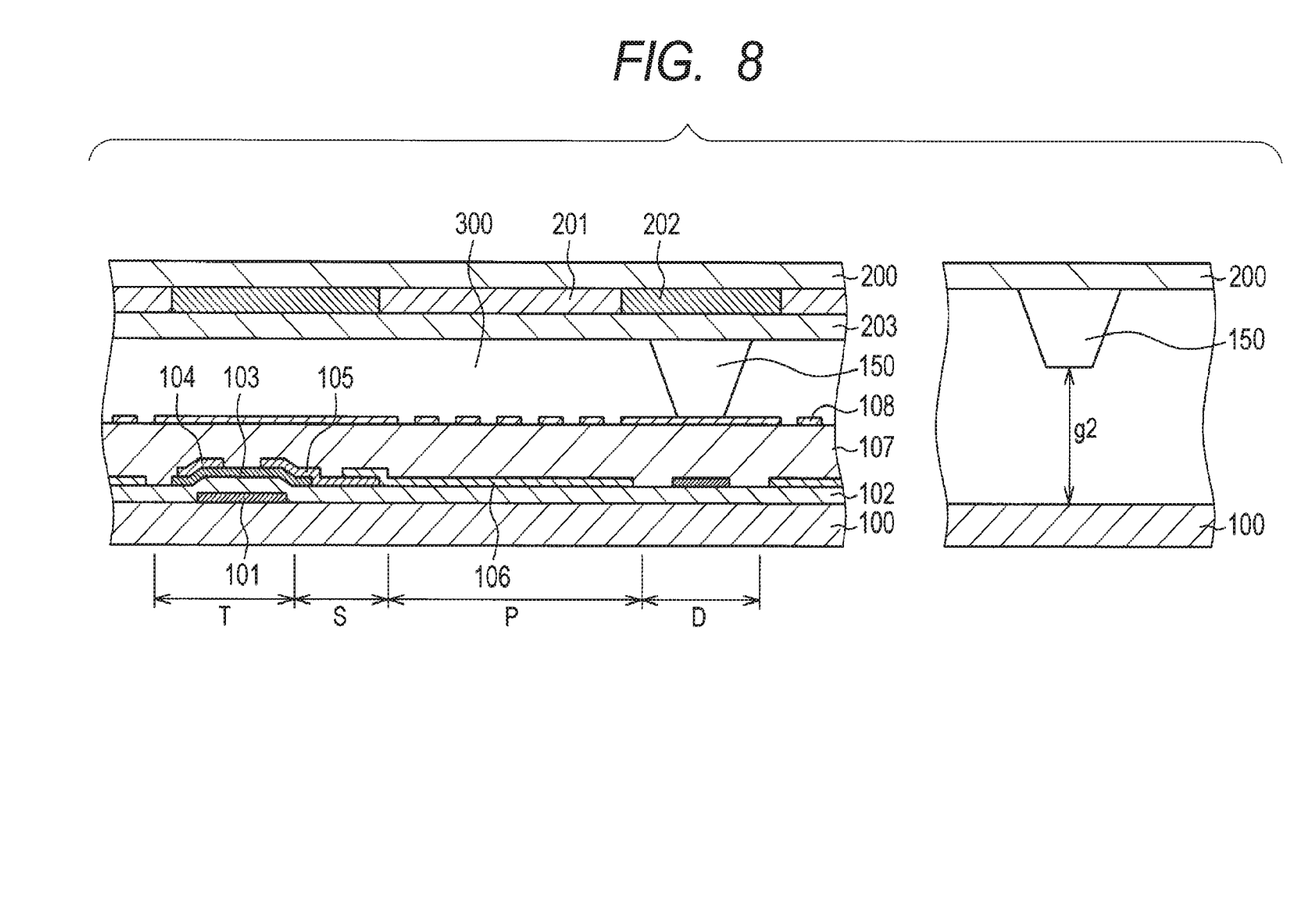
FIG. 8 shows a cross-sectional view of the display area in the mother substrate, and a cross-sectional view of a liquid crystal cell on the outside of the sealing material.

FIG. 8 is a cross-sectional view in which the cylindrical spacer 150 is formed in the area where the liquid crystal cells are not provided shown in FIG. 7. In FIG. 8, there is no film formed on the outside of the liquid crystal cell in the counter substrate 200, and only the gate insulating film 102 is formed in the TFT substrate 100. In such a structure, when the cylindrical spacer 150 is formed in the counter substrate 200, a gap g2 is formed. This does not mean that the distance between the TFT substrate 100 and the counter substrate 200 is provided by the cylindrical spacer 150. In other words, in the state shown in FIG. 8, the TFT substrate 100 or the counter substrate 200 is deformed when the pressure is applied from the outside, so that the distance between the counter substrate 200 and the TFT substrate 100 may not be maintained constant.

Figure 9:
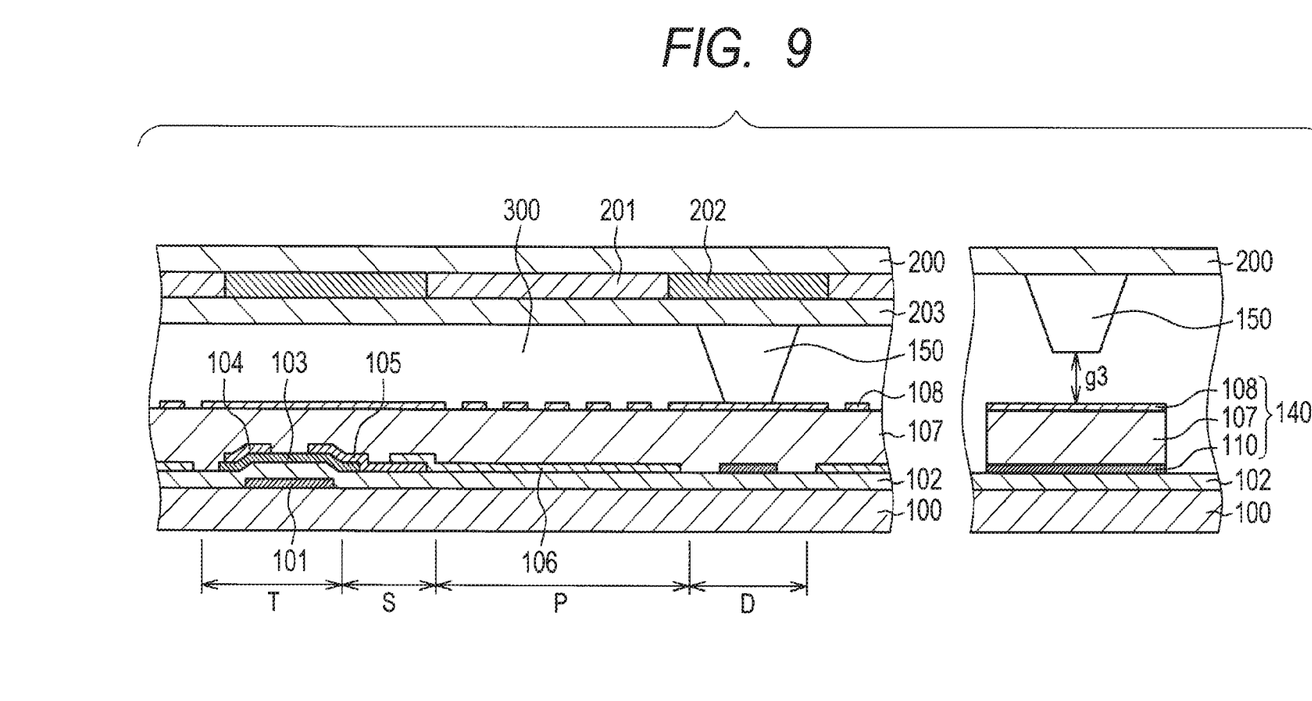
FIG. 9 shows a cross-sectional view of the display area in the mother substrate, and a cross-sectional view of a liquid crystal cell on the outside of the sealing material in which a mount is used.

FIG. 9 shows the state in which the mount 140 is formed in the TFT substrate 100 with respect to the cylindrical spacer 150 formed at the position similar to that shown in FIG. 8. The mount 140 is formed by the following three layers: the metal layer 110 that is the same as the image signal line layer formed on the gate insulating film 102; the inorganic passivation film 107; and the ITO 108 that is the same as the common electrode layer. In this case, the metal layer 110 and the ITO 108, which are conductive films, are floating. This film structure is the same as the film structure of the portion where the cylindrical spacer 150 in the display area faces the TFT substrate 100. However, in this case also, compared to the display area, since the black matrix 202 and the overcoat film 203 are not formed, a gap g3 is formed between the cylindrical spacer 150 and the mount 140. Thus, the distance may not be completely equal to the distance in the display area.

Figure 10:
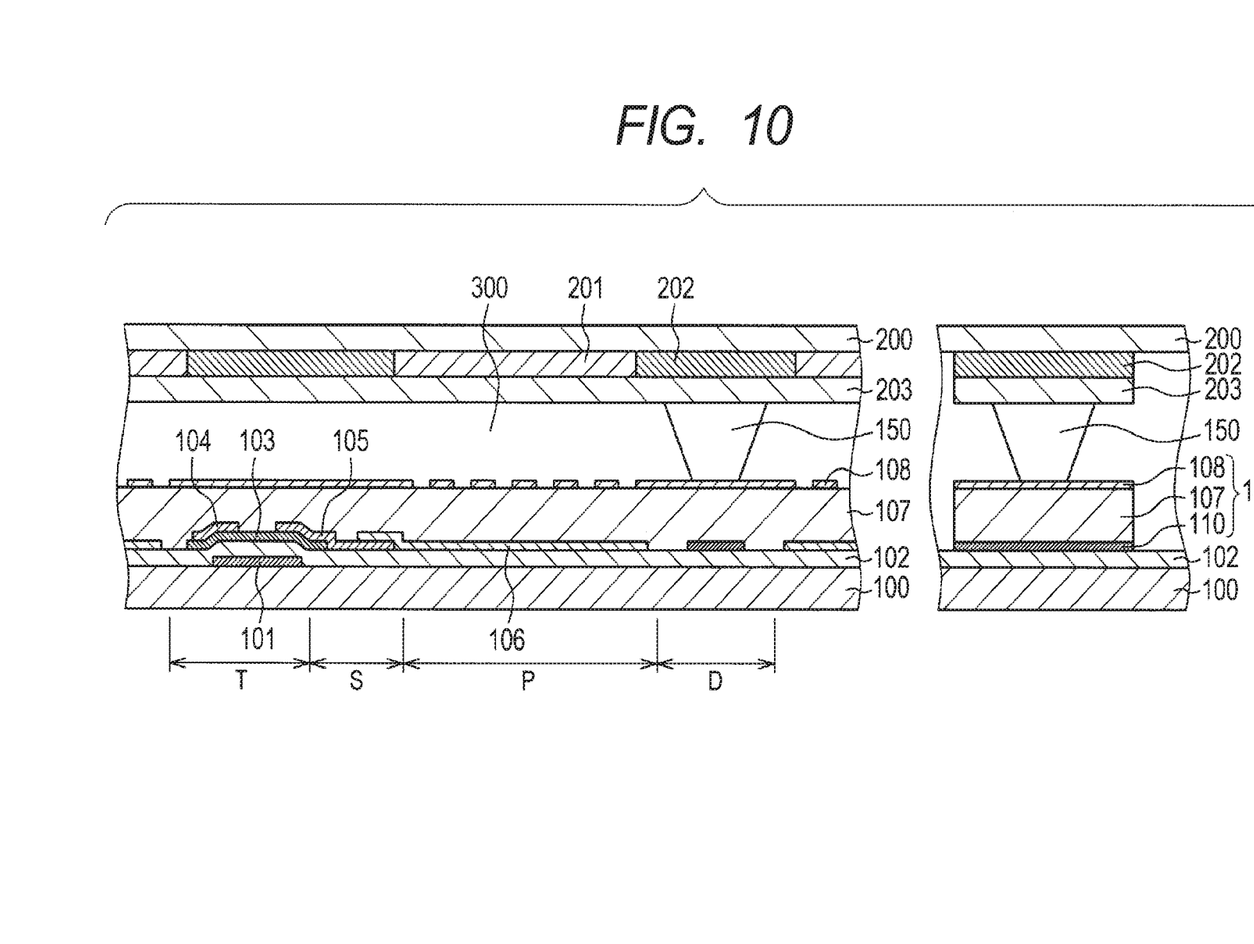
FIG. 10 shows a cross-sectional view of the display area in the mother substrate, and a cross-sectional view of a liquid crystal cell on the outside of the sealing material, in which a cylindrical spacer is formed on a back matrix and overcoat film and a mount is used as well.

FIG. 10 shows the state in which the mount 140 is formed in the TFT substrate 10C with respect to the cylindrical spacer 150 at the position similar to that shown in FIG. 8. The structure of the mount 140 is the same as the structure shown in FIG. 9. FIG. 10 is different from FIG. 9 in that the cylindrical spacer mount 140, which is formed from the black matrix 202 and the overcoat film 203, is also provided in the counter substrate 200. The cylindrical spacer 150 is formed on the laminated film with the same structure as the black matrix 202 and the overcoat film 203, which are formed on the counter substrate 200 in the display area shown in FIG. 10.

Thus, with the structure shown in FIG. 10, it is possible to completely equalize the distance between the counter substrate 200 and the TFT substrate 100 in the area where the display area, and the terminal portion 60 and the liquid crystal cell, which are shown in FIG. 7, are not formed. Thus, the uneven gap does not occur also in the area where a liquid crystal layer 300 exists in the liquid crystal cell.

As described above, according to this embodiment, it is possible to maintain the distance between the TFT substrate 100 and the counter substrate 200 to be constant in the entire mother substrate 1000.

Third Embodiment

Figure 11:
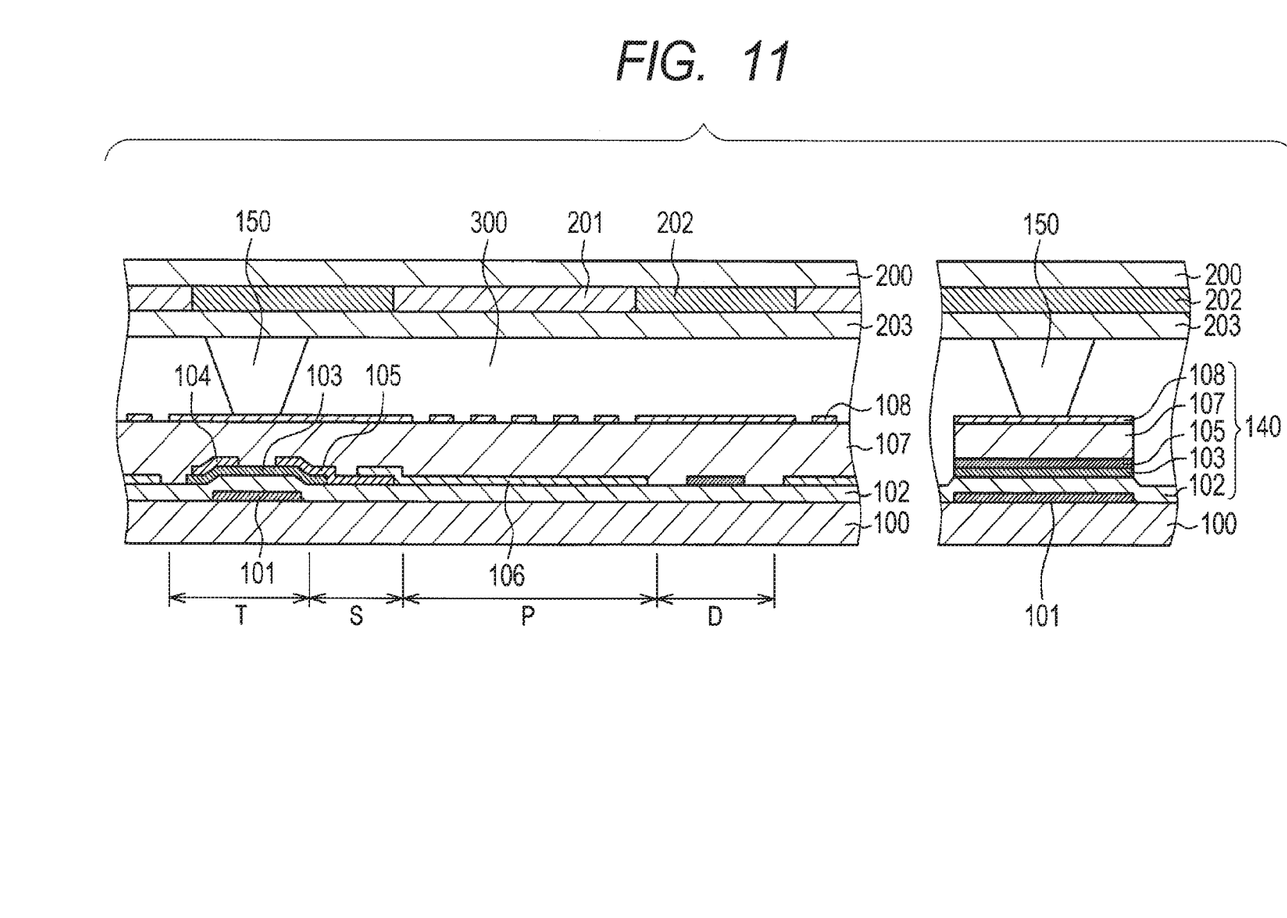
FIG. 11 shows cross-sectional views of the liquid crystal display device when the cylindrical spacer is provided above the TFT in the display area.

A third embodiment is an example in which the cylindrical spacer 150 is formed on the TFT to maintain the distance between the TFT substrate 100 and the counter substrate 200 in the display area. In FIG. 11, in the display area, the cylindrical spacer 150 formed in the counter substrate 200 comes into contact above the TFT formed in the TFT substrate 100. In this case, the structure of the mount 140 within the sealing portion 50 shown in FIG. 1, has the gate electrode 101, the gate insulating film 102, the a-Si film 103, the source-drain layer 105, the inorganic passivation film 107, and the ITO forming the common electrode 108, in this order from the bottom in the counter substrate 200. Thus, the mount 140 shown in the right side of FIG. 11 has the same layer structure as that of the mount 140 shown in FIG. 1. Here, in the mount 140 shown in the right side of FIG. 11, the gate electrode 101, the source-drain electrode 105, and the ITO 108 are conductive films. These conductive films are floating.

Figure 12:
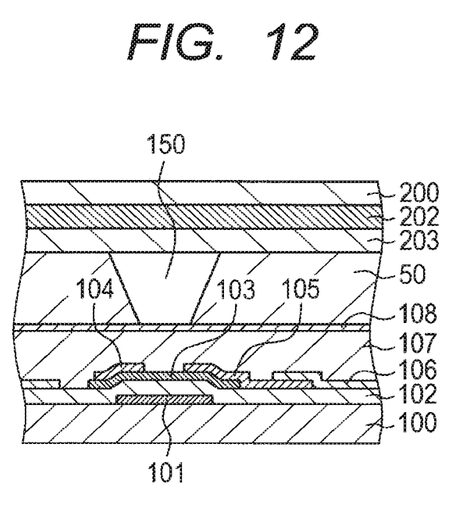
FIG. 12 is a cross-sectional view of the liquid crystal display device when the cylindrical spacer is provided above the TFT in the sealing portion.

FIG. 12 is a cross-sectional view of the sealing portion 50 according to this embodiment, in FIG. 12, the cylindrical spacer 150 is present within the sealing material 50. The cylindrical spacer 150 comes into contact with an oriented film formed on the common electrode 108 formed in the TFT substrate 100, above the TFT constituting the scan line driving circuit 12. In other words, the layer structure of the portion of the TFT substrate 100 with which the cylindrical spacer 150 comes into contact in FIG. 12 is the same both in the display area and in the sealing portion 50.

Although not shown, the layer structure of the mounts 140 shown in FIG. 7, which are formed in the terminal portion 60 of the liquid crystal cell and in the area where the liquid crystal cell is not formed, is also the same as the layer structure shown in FIG. 11 or 12. In other words, the layer structure has the gate electrode 101, the gate insulating film 102, the a-Si film 103, the source-drain layer 105, the inorganic passivation film 107, and the ITO forming the common electrode 106. Then, the gate electrode 101, the source-drain electrodes 104, 105, and the ITO 108 are conductive films. These conductive films are floating.

As described above, according to the present invention, the mount 140 for the cylindrical spacer 150 formed in the area other than the display area, has the same layer structure as that of the mount 140 in the portion of the TFT substrate 100 with which the cylindrical spacer 150 comes into contact in the display area. Thus, it is possible to equalize the distance between the display area and the other area of the liquid crystal display panel, preventing the occurrence of uneven brightness and color, or other imperfections.

According to the embodiments of the present invention, the cylindrical spacer 150 comes into contact with the TFT substrate 100 above the image signal line 20 or the TFT. However, the present invention is not limited to this structure. When the cylindrical spacer 150 comes into contact with the TFT substrate 100 in the area other than the display area, it is possible to form the mount 140 with the same layer structure as that in the display area, as the mount 140 with which the cylindrical spacer 150 comes into contact in the area other than the display area of the liquid crystal display panel.

Further, the mount 140 according to the present invention can be formed at the time of the formation process of the display area of the TFT substrate 100 or the formation process of the display area of the counter substrate 200. Thus, the production cost will not increase.

Further, in each of the embodiments of the present invention, the mount provided in the area where the terminal portion and the liquid crystal cell are not provided has the same structure as the mount provided in the display area. However, the present invention is not limited thereto. For example, it is also possible to use the metal layer that is the same as the scan line layer, instead of using the metal layer that is the same as the image signal line layer used as the mount, by taking into account the film thickness of each layer and the likelihood of the gap formation. Further, it is possible to use the ITO that is the same as the pixel electrode layer, instead of using the ITO that is the same as the common electrode layer. In addition, it is possible to use the color filter layer as a base mount for the cylindrical spacer, instead of the black matrix or the cover coat layer. Further, although the conductive layer of the mount is floating, the conductive layer can be connected to the other conductive layer to apply a certain potential to the whole or a portion of the conductive layer of the mount.

Further, according to the embodiments of the present invention, the scan line driving circuit is formed by a–Si. However, it will be understood that a variety of structures can be used without departing from the spirit and scope of the present invention. For example, the pixels and the scan line driving circuit is formed by poly silicon, or the scan line driving circuit is not formed under the seal.

Although the above description exemplifies the IPS-type liquid crystal display device, the present invention is not limited to this example. The present invention can also be applied to liquid crystal display devices of other types such as TN and VA without having the organic passivation film that is also used as the flattening film in the liquid crystal display panel. Further, the present invention can be applied not only to liquid crystal display devices, but also to display devices in which two glass substrates corresponding to the TFT substrate and the counter substrate are maintained at a predetermined distance including, for example, organic EL display devices and MEMS display devices that controls the transmittance of light by a mechanical driving mechanism.

What is claimed is:

1. A liquid crystal display panel including:
    a TFT substrate;
    a counter substrate facing the TFT substrate through a sealing member; and
    a liquid crystal layer is sandwiched between the TFT substrate and the counter substrate,
    wherein
    the TFT substrate has a first region, which is surrounded by the sealing member and overlapping with the liquid crystal layer, and a second region, which is outside of the first region and not overlapping with the liquid crystal layer,
    a plurality of first spacers formed in the first region, and a plurality of second spacers formed in the second region on the counter substrate,
    a first layer structure has a laminated structure of at least three layers, which includes an inorganic layer,
    the first layer structure is formed in the first region of the TFT substrate at a position facing to one of the first spacers,
    a second layer structure, having a laminated structure and including at least the same laminated structure as the first layer structure, is provided in the second region of the TFT substrate at a position facing to one of the second spacers,
    a light shielding film and an overcoat film are laminated on a portion where the one of the first spacers is formed in the first region and where the one of the second spacers is formed in the second region of the counter substrate, and
    a color filter is laminated on a portion where the one of the first spacers is formed in the first region and on a portion where the one of the second spacers is formed in the second region of the counter substrate.

2. The liquid crystal display device according to claim 1, wherein the TFT substrate includes a TFT, a pixel electrode connected to the TFT, and a common electrode opposed to the pixel electrode,
    a first layer of the first layer structure is the common electrode.

3. The liquid crystal display device according to claim 2, wherein the first layer of the first layer structure is electrically separated from the first layer of the second layer structure,
    the first layer structure and the second layer structure include a second layer made of a metal layer,
    the second layer of the first layer structure is electrically separated from the second layer of the second layer structure.

4. The liquid crystal display device according to claim 3, wherein the second layer in the first layer structure is a video signal line.

5. The liquid crystal display device according to claim 3, wherein the second layer in the first layer structure is a scanning line.

6. The liquid crystal display device according to claim 1, wherein a second layer is formed between the first layer and the TFT substrate.

* * * * *